United States Patent
Fan et al.

(10) Patent No.: US 7,248,835 B2
(45) Date of Patent: Jul. 24, 2007

(54) METHOD FOR AUTOMATICALLY SWITCHING A PROFILE OF A MOBILE PHONE

(75) Inventors: Yu-Fu Fan, Hsin-Chu (TW); In-Ga Chiu, Tao-Yuan Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 634 days.

(21) Appl. No.: 10/707,516

(22) Filed: Dec. 19, 2003

(65) Prior Publication Data

US 2005/0136842 A1  Jun. 23, 2005

(51) Int. Cl.
*H04B 1/00* (2006.01)

(52) U.S. Cl. .............. 455/63.1; 455/67.13; 455/570; 455/114.2; 455/219; 455/222; 455/278

(58) Field of Classification Search .............. 455/63.1, 455/67.13, 570, 114.2, 219, 222, 278.1
See application file for complete search history.

(56) References Cited

U.S. PATENT DOCUMENTS

| | | | |
|---|---|---|---|
| 5,640,143 A * | 6/1997 | Myron et al. ............. | 340/541 |
| 5,764,751 A | 6/1998 | Konishi | |
| 6,067,449 A * | 5/2000 | Jager ....................... | 455/277.2 |
| 6,224,820 B1 * | 5/2001 | Sawa et al. ............... | 266/178 |
| 6,249,913 B1 * | 6/2001 | Galipeau et al. .......... | 725/76 |
| 6,483,884 B1 * | 11/2002 | Shen et al. ................ | 375/347 |
| 6,591,198 B1 * | 7/2003 | Pratt ......................... | 702/35 |
| 6,744,882 B1 * | 6/2004 | Gupta et al. .......... | 379/387.01 |
| 6,766,176 B1 * | 7/2004 | Gupta et al. ............ | 455/550.1 |
| 2002/0095292 A1 * | 7/2002 | Mittal et al. ............. | 704/270 |
| 2003/0228857 A1 * | 12/2003 | Maeki .................... | 455/278.1 |
| 2004/0003391 A1 * | 1/2004 | Gutta et al. .............. | 725/9 |

FOREIGN PATENT DOCUMENTS

| | | | |
|---|---|---|---|
| CN | 1297318 A | | 5/2001 |
| EP | 682419 A2 * | | 11/1995 |
| JP | 10290282 A * | | 10/1998 |

* cited by examiner

*Primary Examiner*—Matthew Anderson
*Assistant Examiner*—Minh Dao
(74) *Attorney, Agent, or Firm*—Winston Hsu

(57) ABSTRACT

A method for automatically switching a profile of a mobile phone includes measuring a current environmental noise value of ambient noise surrounding the mobile phone. The current environmental noise value is then compared to a predetermined noise value, and a noise difference is calculated. Next, the profile of the mobile phone is switched based on the value of the noise difference.

16 Claims, 2 Drawing Sheets

METHOD FOR AUTOMATICALLY SWITCHING A PROFILE OF A MOBILE PHONE

BACKGROUND OF INVENTION

1. Field of the Invention

The present invention relates to mobile phone profiles, and more specifically, to a method for automatically switching a profile of a mobile phone based on a current ambient noise value and a current antenna signal strength value.

2. Description of the Prior Art

With the increased pace of modern life, the ability to communicate anywhere and anytime is important to many people. One result is the increasing use of mobile phones. Although it is convenient for users to receive phone calls wherever they may be, there are also times when a user may not wish to be disturbed by an incoming call or message.

Most current mobile phones offer several different profiles that can be used to change several mobile phone settings at once. For instance, suppose that a mobile phone offers a Meeting profile and an Outdoor profile. As the names suggest, the Meeting profile is intended for times in which the user of the mobile phone is in a meeting, and the Outdoor profile is intended for times when the user is outside. Various audio and visual indicators can be adjusted after switching from one profile to another. For instance, in the Meeting profile, the vibrate function may be turned on and the ringer may be turned off so as to not disturb other people attending the meeting. Likewise, in the Outdoor profile, the ringer is turned on, and the volume may be increased so that the user of the mobile phone will hear an incoming phone call while outdoors. Typically, each of these profiles is customizable, so that the user can specify exactly which mobile phone functions are affected when switching profiles.

In order to switch from one profile to another, the user of the mobile phone typically has to press keys on a keypad of the mobile phone in order to manually switch the profile. Unfortunately, the user may forget to switch the profile at the end of an activity. For example, suppose the user of the mobile phone has just finished a meeting and is now going outdoors. Being preoccupied with the topics just discussed at the meeting, the user may forget to switch the profile of the mobile phone from the Meeting profile to the Outdoor profile. Depending on the settings associated with each profile, failure to properly switch the profile of the mobile phone could lead to phone calls being missed accidentally.

SUMMARY OF INVENTION

It is therefore a primary objective of the claimed invention to provide a method for automatically switching a profile of a mobile phone in order to solve the above-mentioned problems.

According to the claimed invention, a method for automatically switching a profile of a mobile phone is disclosed. The method includes measuring a current environmental noise value of ambient noise surrounding the mobile phone, comparing the current environmental noise value to a predetermined noise value and calculating a noise difference, and switching the profile of the mobile phone based on the value of the noise difference.

It is an advantage of the claimed invention that the mobile phone can automatically switch the profile based on the current ambient noise value so as to simplify the use of the mobile phone. With the use of the automatic profile switching function, the mobile phone user does not have to worry about manually switching the profile when starting a new activity, and does not have to remember to switch it back at the end of the activity.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
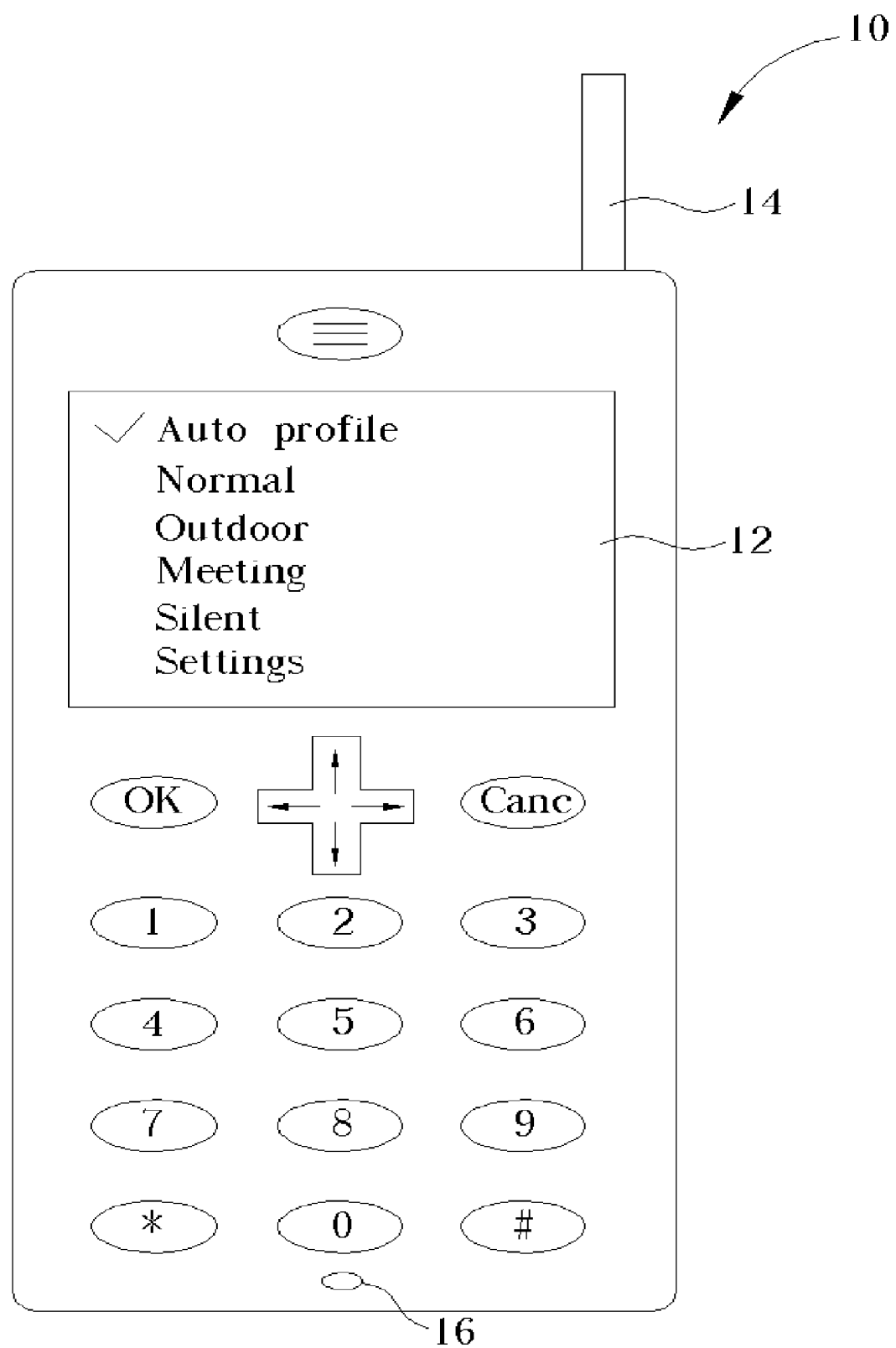
FIG. 1 is a diagram of a mobile phone according to the present invention.

Please refer to FIG. 1. FIG. 1 is a diagram of a mobile phone 10 according to the present invention. The mobile phone 10 contains a display 12, on which a profile selection menu is shown. The profile selection menu allows a user of the mobile phone 10 to choose a profile or to customize profile settings. As an example, six choices are shown in the profile selection menu: Auto profile, Normal profile, Outdoor Profile, Meeting profile, Silent profile, and Settings. The Normal, Outdoor, Meeting, and Silent profiles are four different profiles that can be uniquely customized by the mobile phone 10 user. Choosing the Settings option takes the user into another menu, which allows the user to customize each of the four different profiles. Finally, the Auto profile function is also shown, and can be activated or deactivated (the checkmark in FIG. 1 represents that the Auto profile function is currently activated) by the user.

The automatic profile switching function is the subject of the present invention, and will now be described in greater detail. The present invention collects two kinds of data when the mobile phone 10 is in idle mode, meaning the phone is turned on, but is not currently being used by the user. An antenna 14 of the mobile phone 10 is used to measure a current antenna signal strength value from radio signals received by the mobile phone 10. Depending on the magnitude of the current antenna signal strength value, the mobile phone 10 will then determine if the user of the mobile phone 10 is located indoors or outdoors. Additionally, a microphone 16 of the mobile phone 10 is used to measure a current environmental noise value of ambient noise surrounding the mobile phone 10.

The present invention method of automatically switching the profile of the mobile phone 10 involves comparing the current antenna signal strength value to a reference antenna signal strength value and comparing the current environmental noise value to a reference noise value. Based on these two comparisons, the mobile phone 10 then automatically switches to the profile which is most appropriate.

Figure 2:
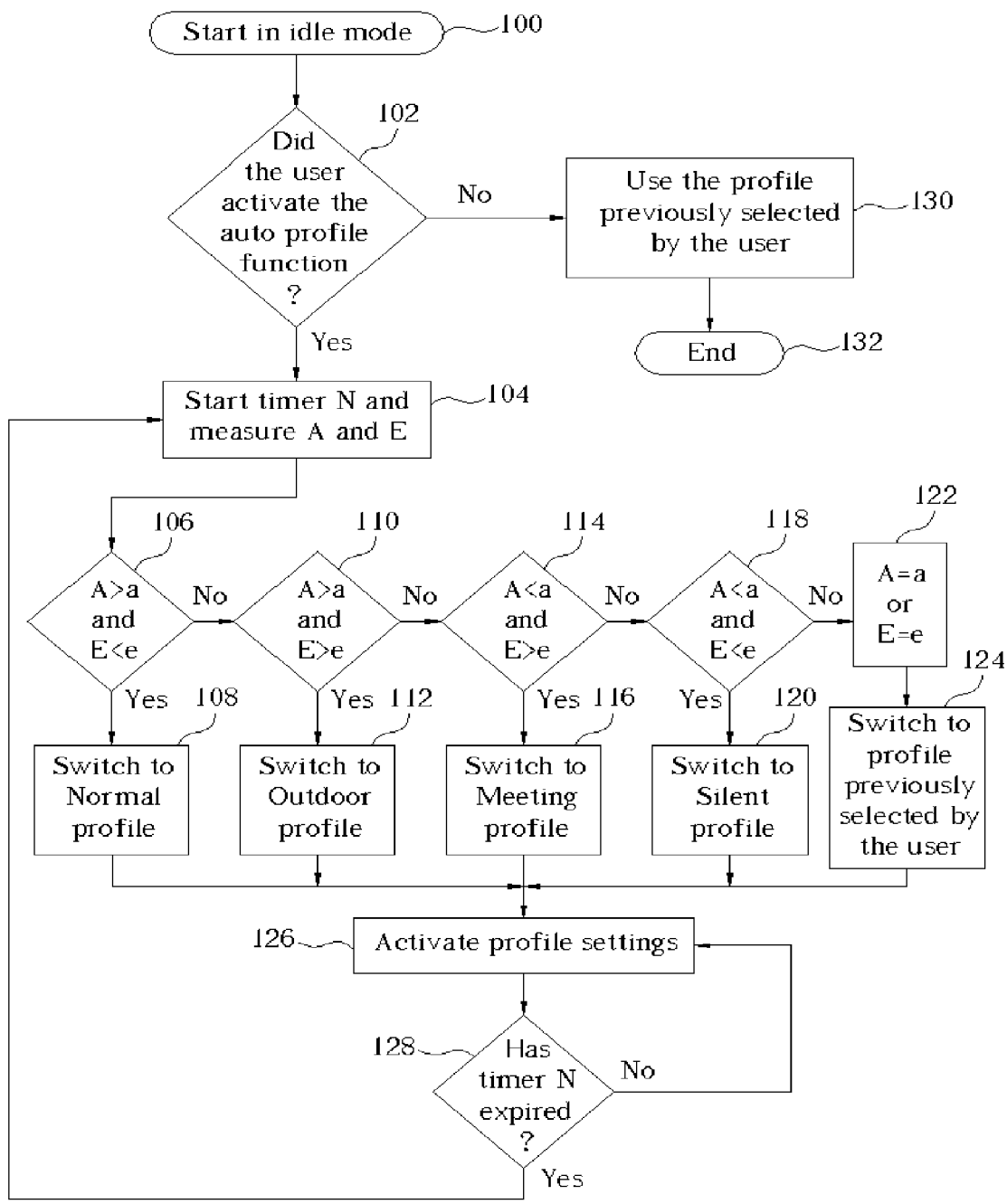
FIG. 2 is a flowchart illustrating automatically switching the profile of the mobile phone according to the present invention method.

Please refer to FIG. 2. FIG. 2 is a flowchart illustrating automatically switching the profile of the mobile phone 10 according to the present invention method. Steps contained in the flowchart will be explained below.

Step 100: Start in idle mode;

Step 102: Determine if the user has activated the automatic profile switching function; if so, go to step 104; if not, go to step 130;

Step 104: Start a timer to begin counting for a time period N. At the same time, measure the current antenna signal strength value (A) and the current environmental noise value (E). The timer is used for indicating that the current antenna signal strength value and the current environmental noise value should be measured periodically, after every time period N;

Step 106: Determine if the current antenna signal strength value (A) is greater than the reference antenna signal strength value (a) and if the current environmental noise value (E) is less than the reference noise value (e); if so, go to step 108; if not, go to step 110;

Step 108: Automatically switch the profile of the mobile phone 10 to the Normal profile; go to step 126;

Step 110: Determine if the current antenna signal strength value (A) is greater than the reference antenna signal strength value (a) and if the current environmental noise value (E) is greater than the reference noise value (e); if so, go to step 112; if not, go to step 114;

Step 112: Automatically switch the profile of the mobile phone 10 to the Outdoor profile; go to step 126;

Step 114: Determine if the current antenna signal strength value (A) is less than the reference antenna signal strength value (a) and if the current environmental noise value (E) is greater than the reference noise value (e); if so, go to step 116; if not, go to step 118;

Step 116: Automatically switch the profile of the mobile phone 10 to the Meeting profile; go to step 126;

Step 118: Determine if the current antenna signal strength value (A) is less than the reference antenna signal strength value (a) and if the current environmental noise value (E) is less than the reference noise value (e); if so, go to step 120; if not, go to step 122;

Step 120: Automatically switch the profile of the mobile phone 10 to the Silent profile; go to step 126;

Step 122: The current antenna signal strength value (A) is equal to the reference antenna signal strength value (a) or the current environmental noise value (E) is equal to the reference noise value (e); go to step 124;

Step 124: Automatically switch the profile of the mobile phone 10 to a profile that was previously selected by the user of the mobile phone 10; go to step 126;

Step 126: The new profile settings of the mobile phone 10 are activated;

Step 128: Determine if the timer has finished counting for the time period N; if so, go back to step 104; if not, go back to step 126;

Step 130: Since the automatic profile switching function was not activated by the user of the mobile phone 10, use the profile that was previously selected by the user of the mobile phone 10; and Step 132: End.

In summary, the present invention method measures the current antenna signal strength value and the current environmental noise value when the mobile phone 10 is in idle mode to automatically switch the profile of the mobile phone 10. Based on these two measurements, the mobile phone 10 will determine the most likely type of environment that the user of the mobile phone 10 is located in, and will automatically switch the profile accordingly. Since the user talking on the phone would greatly affect the current environmental noise value, the automatic profile switching will only take place when the mobile phone 10 is in idle mode. In addition, the mobile phone 10 will use the timer to measure the current antenna signal strength value and the current environmental noise value after every time period N so as to periodically monitor any changes in the environment of the mobile phone 10.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for automatically switching a profile of a mobile phone, the method comprising:
   (a) measuring a current environmental noise value of ambient noise surrounding the mobile phone;
   (b) comparing the current environmental noise value to a predetermined noise value and calculating a noise difference;
   (c) measuring a current antenna signal strength value from antenna signals received by the mobile phone;
   (d) comparing the current antenna signal strength value to a predetermined antenna signal strength value and calculating a signal strength difference; and
   (e) switching the profile of the mobile phone based on the values of the noise difference and the signal strength difference.

2. The method of claim 1 wherein steps (a) to (e) are performed when the mobile phone is in idle mode.

3. The method of claim 1 further comprising:
   (f) using a timer to count for a predetermined period of time; and
   (g) repeating steps (a) to (e) and restarting the timer when the timer has finished counting for the predetermined period of time.

4. The method of claim 1 further comprising:
   switching the profile of the mobile phone to a first profile if the current antenna signal strength value is greater than the predetermined antenna signal strength value and the current environmental noise value is less than the predetermined noise value;
   switching the profile of the mobile phone to a second profile if the current antenna signal strength value is greater than the predetermined antenna signal strength value and the current environmental noise value is greater than the predetermined noise value;
   switching the profile of the mobile phone to a third profile if the current antenna signal strength value is less than the predetermined antenna signal strength value and the current environmental noise value is greater than the predetermined noise value;
   switching the profile of the mobile phone to a fourth profile if the current antenna signal strength value is less than the predetermined antenna signal strength value and the current environmental noise value is less than the predetermined noise value; and
   switching the profile of the mobile phone to a fifth profile if the current antenna signal strength value is equal to the predetermined antenna signal strength value or the current environmental noise value is equal to the predetermined noise value.

5. The method of claim 4 wherein settings of each of the first through fifth profiles are customizable by the user of the mobile phone.

6. The method of claim 4 wherein the first profile is a normal profile, the second profile is an outdoor profile, the third profile is a meeting profile, the fourth profile is a silent profile, and the fifth profile is a profile previously selected by the user of the mobile phone.

7. The method of claim 1 wherein the current environmental noise value of ambient noise surrounding the mobile phone is detected with a microphone of the mobile phone.

8. The method of claim 1 wherein the profile of the mobile phone is automatically switched only when a user of the mobile phone activates an automatic profile switching function.

9. A method for automatically switching a profile of a mobile phone, the method comprising:
(a) measuring a current antenna signal strength value from antenna signals received by the mobile phone;
(b) comparing the current antenna signal strength value to a predetermined antenna signal strength value and calculating a signal strength difference;
(c) measuring a current environmental noise value of ambient noise surrounding the mobile phone; and
(d) comparing the current environmental noise value to a predetermined noise value and calculating a noise difference; and
(e) switching the profile of the mobile phone based on the values of the signal strength difference and the noise difference.

10. The method of claim 9 wherein steps (a) to (e) are performed when the mobile phone is in idle mode.

11. The method of claim 9 further comprising:
(f) using a timer to count for a predetermined period of time; and
(g) repeating steps (a) to (e) and restarting the timer when the timer has finished counting for the predetermined period of time.

12. The method of claim 9 further comprising:
switching the profile of the mobile phone to a first profile if the current antenna signal strength value is greater than the predetermined antenna signal strength value and the current environmental noise value is less than the predetermined noise value;
switching the profile of the mobile phone to a second profile if the current antenna signal strength value is greater than the predetermined antenna signal strength value and the current environmental noise value is greater than the predetermined noise value;
switching the profile of the mobile phone to a third profile if the current antenna signal strength value is less than the predetermined antenna signal strength value and the current environmental noise value is greater than the predetermined noise value;
switching the profile of the mobile phone to a fourth profile if the current antenna signal strength value is less than the predetermined antenna signal strength value and the current environmental noise value is less than the predetermined noise value; and
switching the profile of the mobile phone to a fifth profile if the current antenna signal strength value is equal to the predetermined antenna signal strength value or the current environmental noise value is equal to the predetermined noise value.

13. The method of claim 12 wherein settings of each of the first through fifth profiles are customizable by the user of the mobile phone.

14. The method of claim 12 wherein the first profile is a normal profile, the second profile is an outdoor profile, the third profile is a meeting profile, the fourth profile is a silent profile, and the fifth profile is a profile previously selected by the user of the mobile phone.

15. The method of claim 9 wherein the current environmental noise value of ambient noise surrounding the mobile phone is detected with a microphone of the mobile phone.

16. The method of claim 9 wherein the profile of the mobile phone is automatically switched only when a user of the mobile phone activates an automatic profile switching function.

* * * * *